United States Patent [19]

Bear

[11] Patent Number: 4,664,418
[45] Date of Patent: May 12, 1987

[54] ORDER HANDLING SHEET AND METHOD

[76] Inventor: Gerald Bear, 20 Kent Rd., Winnetka, Ill. 60093

[21] Appl. No.: 870,428

[22] Filed: Jun. 4, 1986

[51] Int. Cl.⁴ ............... B42D 15/00; G06C 25/00; H04L 3/00; G09C 1/04
[52] U.S. Cl. .................. 283/67; 283/1 A; 235/145 R; 340/365 R; 440/472; 380/56
[58] Field of Search ........... 283/1 A, 1 R, 30, 46, 283/48 R, 55, 57, 60 A, 67; 235/145 R, 146; 340/364, 365, 366; 434/121, 125, 128

[56] References Cited

U.S. PATENT DOCUMENTS

| | | | |
|---|---|---|---|
| 3,003,255 | 10/1961 | Katz | 235/145 R |
| 3,003,688 | 10/1961 | Menge | 235/145 |
| 4,460,342 | 7/1984 | Mills | 283/1 A |
| 4,475,811 | 10/1984 | Brunne | 283/1 A |
| 4,543,563 | 9/1985 | Wine | 283/1 A |
| 4,603,884 | 8/1986 | Burton | 283/1 A |
| 4,604,605 | 8/1986 | Meyers et al. | 340/365 R |

Primary Examiner—Paul A. Bell
Assistant Examiner—Paul M. Heyrana, Sr.
Attorney, Agent, or Firm—McDougall, Hersh & Scott

[57] ABSTRACT

A system for handling orders including a sheet defining a plurality of delineated spaces. Indicia are displayed in the spaces for identifying a plurality of items available for ordering, and a pencil or other marking device is used for placing marks in selected ones of the spaces. The sheet is used in conjunction with a cash register or similar device, and the delineated spaces on the sheet form a pattern corresponding with the pattern of keys on the register. In use, the operator of the register will depress or otherwise operate the keys of the register in only those positions bearing a mark. In this fashion, the register will record the particular items ordered, and the sheet can then be used for order-filling and verification after removal from the face of the register.

13 Claims, 3 Drawing Figures

ORDER HANDLING SHEET AND METHOD

Background of the Invention

This invention relates to an order handling system particularly useful in fast food establishments. The invention includes a sheet permitting efficient identification of items ordered by customers in the establishment, efficient recording of the items on a register of the type typically used in such establishments, and efficient filling and verification of the order.

The invention addresses problems often encountered in fast food establishments during peak operating periods. Such establishments typically have counters with one or more stations for taking orders, and during peak periods, lines develop at such stations. One or more employees occupy these stations, and as each customer arrives at the station, it is the duty of the employee or employees to first record the order of the customer. This order may be written on a pad, with the charge for the order then being calculated on a register, or an employee may operate the register simultaneously with taking of the order.

Various means may be employed for then filling the order. In some cases, the employee at the register may orally or with some written order ask for the ordered items in which case another employee will be responsible for delivering the items to the customer at the register station or at some other designated location in the establishment. In other systems, the employee operating the register may also be responsible for collecting the ordered items from respective stocks and delivering them to the customer.

The systems utilized tend to be inefficient from the standpoint of the requirement for taking an order, transmitting that information to a register to calculate the charges involved and to otherwise make a record of the transaction, and to provide for delivery of the ordered items to the customer. Mistakes are common both during oral transmission of the order from the customer to the employee, and by the employee during either writing of the order, during operation of the register, or during the order-filling phase of the operation.

Summary Of The Invention

The order-handling system of this invention includes a sheet defining a plurality of delineated spaces. In a typical use in a fast-food establishment, indicia are displayed in the spaces for identifying the several food and drink items available for ordering.

As is also typical in such establishments, registers are employed for recording the order and for simultaneously determining the charges for the order. The sheet used in the system of the invention has the aforesaid spaces arranged to correspond with the pattern of operating keys on the register. Accordingly, the sheet can be placed on the register surface with the spaces aligned with the keys so that the employee using the register can operate the register keys through the overlying sheet.

In accordance with the method of the invention, customers of an establishment will be asked to look at a sheet of the type described and to then indicate which items are to be ordered. Either an employee or the customer will then mark those spaces on the sheet applicable to the items being ordered. In a fast-food establishment, particularly during peak periods, an employee may be stationed in the customer waiting area and there provide the sheets and marking pencils and the like.

When the customer arrives at the register with a marked sheet in hand, the employee at the register merely places the sheet on the surface of the register and operates the register keys through the sheet. For example, if the customer has marked the spaces designating a hamburger and an orange drink, the register operator can merely press the two marked spaces on the paper to thereby operate the underlying keys.

As is now common, the register is programmed to automatically determine the charge for a hamburger and orange drink in response to the operation of the two keys. In other words, registers in establishments of the type involved are programmed so that individual keys designate specific items. Once the complete order has been introduced to the register, one or more additional keys will provide totals, add taxes, etc., so that the complete charge to the customer will be determined. In a typical situation, this will include both a visual display and a printed receipt.

Once the register operation is completed, the sheet may then be used for order-filling purposes. For example, the operator may either refer to the sheet for picking up items ordered, or hand the sheet to other employees having that responsibility. Finally, the same sheet will serve to verify that the order has been correctly filled when the customer is ready to take the ordered items.

Detailed Description of the Invention

Figure 1:
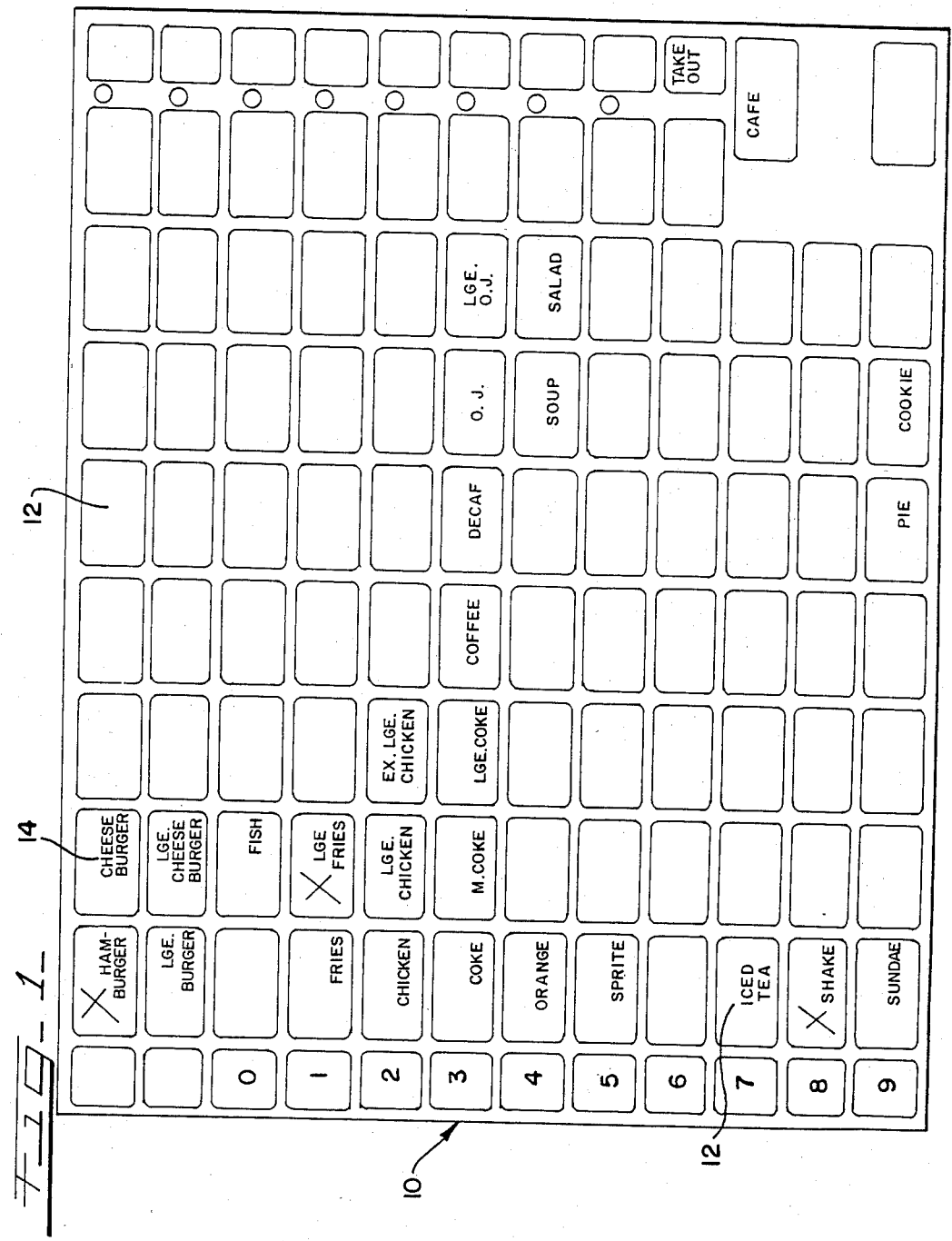
FIG. 1 comprises a plan view of an order-handling sheet of the type contemplated by this invention.

FIG. 1 illustrates an order-handling sheet 10 of the type contemplated by this invention. This sheet includes a plurality of delineated spaces 12 with some of the spaces including printed indicia 14 for indicating items available for purchase. These indicia are printed on the sheet and usually will represent items commonly available. Various of the spaces 12 are left blank and can be used to permit ordering of special items occasionally available. Thus, at the start of the business day, one or more of these blank spaces could be filled in on all of the sheets contemplated for use on that day. Similarly, sheets could be altered before use by crossing out certain of the printed items which happen to be unavailable.

Figure 2:
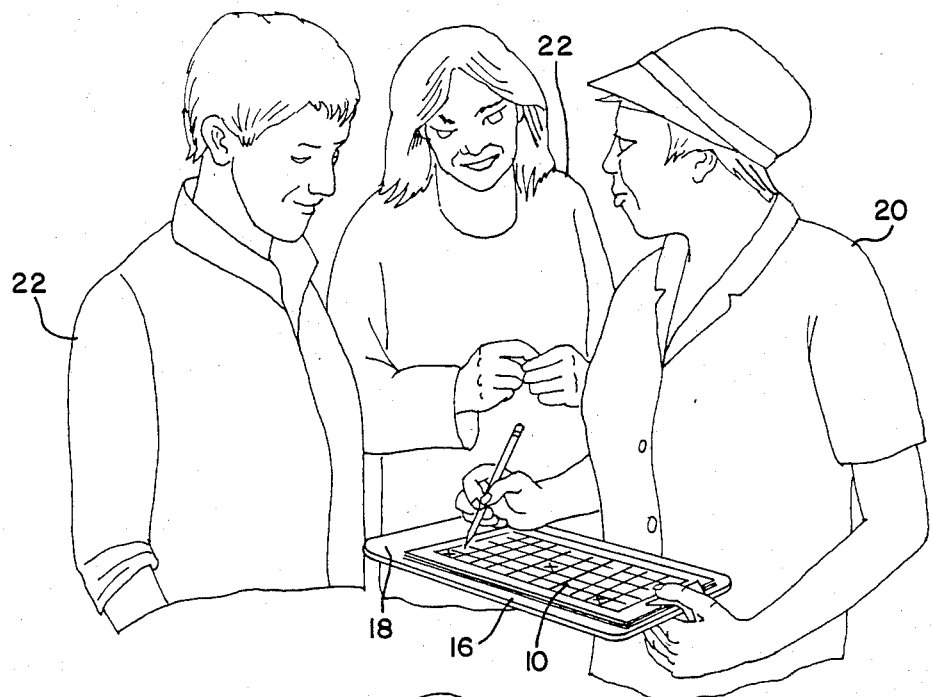
FIG. 2 is an illustration of the manner in which the sheet is used for order-taking; and, FIG. 3 illustrates the manner in which the sheet is used in conjunction with a register.

As indicated in FIG. 2, a plurality of sheets may be formed into a stack 16 and held on a clipboard 18. It is also contemplated that the sheets may initially be formed into a pad adhesively bound at one end. In any event, the sheets are provided for taking one order at a time by an employee shown at 20.

Figure 3:
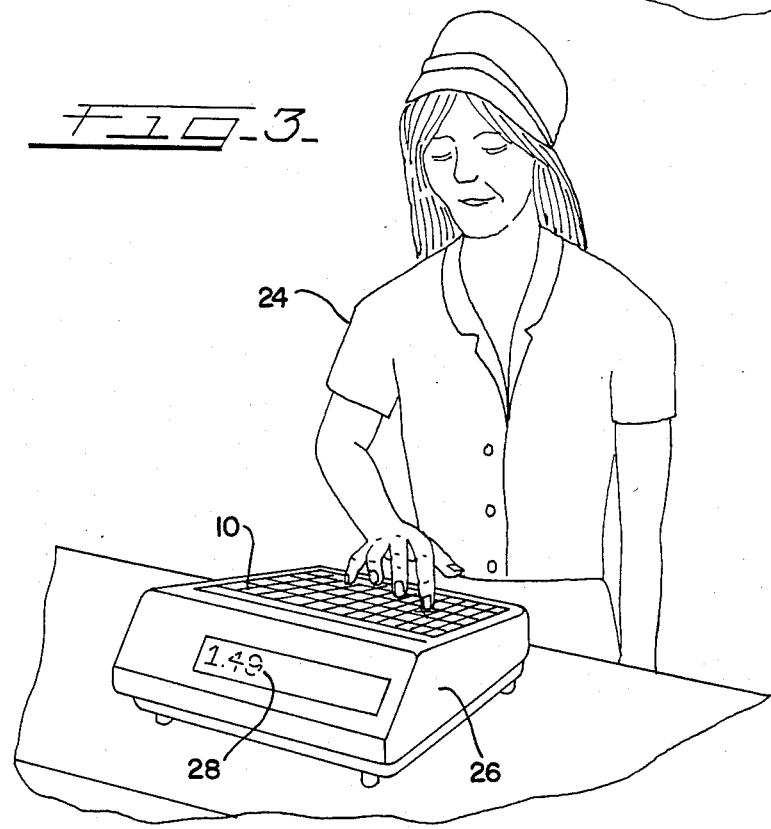

In the illustration of FIG. 2, the customers shown at 22 advise the employee of the items desired, and the employee then marks the spaces corresponding to the items ordered. When the order taking is completed, the employee directly, or the customer, will then hand the sheet to a register operator 24 shown in FIG. 3. This operator places the marked sheet 10 over the face of register 26.

The individual spaces on the sheet 10 form a pattern corresponding with the pattern of keys on the register 26. In addition, the sheet is designed so that it can be automatically aligned on the face of the register, for example, by providing borders on the sheet fitting the borders of the register face.

The register operator 24 records the order by simply pressing each of the items marked on the sheet. In the illustration of FIG. 1, X's have been placed on the sheet by the employee 20 for ordering a hamburger, large fries, and a shake. With the register programmed in a fashion so that depressing of the underlying keys will record the charge for these items, the operator need only press these three spaces, total the charge, add tax where necessary, and thus provide the customer with a display of the amount as shown at 28 and, in some cases, with a printed receipt.

After removal of the sheet from the register face, it can serve the additional functions of order-filling and order verification. Either the register operator or some other employee can use the sheet to pick up the items identified by the marks on the sheet and either the employee or the customer can then use the sheet to verify that each of the items ordered has been provided.

The system described has the advantage of minimizing errors while also greatly facilitating order-handling. Particularly during peak periods, employees are rushed and tend to make more mistakes. By providing an order sheet with marks identifying the items ordered, the possibility of an oral misunderstanding is minimized. This is particularly true where the customer marks the sheet but is also true when an employee marks the sheets since, as shown in FIG. 2, the customers can observe the placement of the marks.

Errors are also minimized at the register since the employee simply operates keys for marked areas rather than being required to interpret an orally given order and to then read a corresponding key. Similarly, where the sheet is used for order-filling, a clear and easily read record of the items involved is available.

Operating efficiency is improved since the avoidance of mistakes necessarily speeds up any operation. Furthermore, the time necessary for recording on the register is greatly diminished since the operator's sole function is to place the sheet on the register face and operate the keys. There is no delay for taking an order since that has previously been accomplished by the marking of the sheet.

Various changes and modifications may be made in the above-described invention without departing from the spirit thereof particularly as defined in the following claims.

That which is claimed is:

1. A sheet for handling an order of selected items among many items available, and for use in recording the order on a register, said sheet defining a plurality of delineated spaces, indicia displayed in such spaces identifying said items, said spaces being arranged on said sheet in a pattern corresponding with the pattern defined by the positions of keys associated with said register, and wherein marking means are employed for marking the spaces identifying the selected items whereby said sheet can be placed on said register in overlying relationship with said keys, and whereby said keys can then be operated through said sheet to thereby record the order on the register.

2. A sheet in accordance with claim 1 wherein indicia are printed in at least some of said spaces.

3. A sheet in accordance with claim 2 wherein said indicia identify food and drink items.

4. A sheet in accordance with claim 2 including blank spaces to permit adding of indicia to the sheet.

5. A stack of sheets of the type claimed in claim 1, said sheets being removable from the stack after marking of said spaces, and said sheets being disposable after recording of the order.

6. A stack in accordance with claim 5 wherein the sheets are adhesively bound at one end so that they can be torn off the stack one at a time.

7. A method for handling an order of selected items among many items available, and for use in recording the order on a register, said method including the steps of providing a sheet defining a plurality of delineated spaces, indicia displayed in such spaces identifying said items, said spaces being arranged on said sheet in a pattern corresponding with the pattern defined by the positions of keys associated with said register, marking spaces on said sheet to identify selected items, placing the marked sheet on said register in overlying relationship with said keys, and operating selected keys by engaging the marked spaces on said sheet to thereby record the order on the register.

8. A method in accordance with claim 7 wherein indicia are printed in at least some of said spaces.

9. A method in accordance with claim 8 wherein said indicia identify food and drink items.

10. A method in accordance with claim 8 including adding indicia in blank spaces on said sheet to provide for selection of items in addition to those identified by printed indicia.

11. A method according to claim 7 wherein a stack of sheets is provided, and including the steps of removing a sheet from the stack after marking of said spaces.

12. A method in accordance with claim 11 including adhesively binding the stack at one end so that the sheets are torn off the stack one at a time.

13. A method in accordance with Claim 1 including the step of removing the sheet from the register and then using the sheet for order-filling.

* * * * *